United States Patent
Yawalkar et al.

(10) Patent No.: US 10,819,750 B1
(45) Date of Patent: Oct. 27, 2020

(54) MULTI-TENANT AUTHENTICATION AND PERMISSIONS FRAMEWORK

(71) Applicant: Amazon Technologies, Inc., Seattle, WA (US)

(72) Inventors: Piyush Pramod Yawalkar, London (GB); Sandeep Archana Vasudevan, London (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 265 days.

(21) Appl. No.: 15/964,935

(22) Filed: Apr. 27, 2018

(51) Int. Cl.
*G06F 7/04* (2006.01)
*H04L 29/06* (2006.01)

(52) U.S. Cl.
CPC .......... *H04L 63/20* (2013.01); *H04L 63/0884* (2013.01)

(58) Field of Classification Search
CPC ..... G06F 21/31; G06F 21/62; H04L 29/06843
USPC .......................................................... 726/6
See application file for complete search history.

(56) References Cited

U.S. PATENT DOCUMENTS

| 2007/0289009 | A1* | 12/2007 | Phan-Anh | H04W 12/06 726/12 |
| 2014/0331293 | A1* | 11/2014 | Toole | G06F 21/60 726/5 |
| 2014/0373090 | A1* | 12/2014 | Murgia | G06F 21/45 726/1 |
| 2017/0118221 | A1* | 4/2017 | Hannel | H04L 63/0471 |

OTHER PUBLICATIONS

Lin et al, A New Non-Intrusive Authentication Method Based on the Orientation Sensor for Smartphone Users, 2012, IEEE, pp. 245-252.*

* cited by examiner

*Primary Examiner* — Alexander Lagor
*Assistant Examiner* — Jenise E Jackson
(74) *Attorney, Agent, or Firm* — Thomas | Horstemeyer, LLP (57) ABSTRACT

Disclosed are various embodiments for a multi-tenant authentication and permissions framework. In a first embodiment, an interceptor intercepts a request to perform an operation with respect to a network resource from a client device, authenticates the client device has having a user identity with an authentication service, receives data from a permissions service indicating whether the user identity has permission to perform the operation, and forwards the request to perform the operation to a service.

20 Claims, 8 Drawing Sheets

Welcome Internal User at 10.1.1.2! Please log in using your employee credentials:

Employee ID: ☐

Password: ☐

Submit

100a

Welcome visitor at 34.54.3.253! Please log in using your account:

Username: ☐

Password: ☐

Submit

MULTI-TENANT AUTHENTICATION AND PERMISSIONS FRAMEWORK

BACKGROUND

An organization may have different authentication approaches depending on whether a user is an internal user or an external user. For example, internal users may be employees, and external users may be customers. In order to access a particular secured resource that requires authentication, external users and internal users may have to go through different servers, web pages, and/or uniform resource locators (URLs) so that they can be authenticated using the appropriate authentication approach.

Also, in a multi-tenant environment where multiple external entities access resources provided by an organization, managing permissions may be difficult. An organization that operates a multi-tenant environment may desire not to integrate external users into an internal permissions framework for security reasons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a framework for handling authentication and permissions in multi-tenant computing environments. Multi-tenant computing environments may have multiple approaches to authentication depending on which class of users, of multiple classes, that a user falls within. For example, internal users such as employees may log in through an authentication service backed by a lightweight directory access protocol (LDAP) server, while external users such as customers or vendors may log in through an authentication portal with which they have created an account. In some cases, such an account may be federated among multiple external web sites such that authentication for the external web sites is performed through the same identity provider. In order to use the appropriate authentication approach, users may have to log on through different servers, pages, or uniform resource locators (URL), which is cumbersome.

Various embodiments of the present disclosure introduce an automatic selection of an appropriate authentication approach for multi-tenant computing environments. For example, internal users may use client devices that are on a particular network segment or subnet, while external users may use client devices that are not on that particular network segment or subnet. A gateway can identify which class of users to which a client device pertains according to the network address or other identifying data presented by the client device. The gateway can then add a header to a resource request that indicates the class of users. When the request is routed to a network resource server, the server can automatically select a particular approach of multiple authentication approaches according to the request header indicating the class of users.

A related problem for multi-tenant computing environments involves authorizing access to resources via a permissions framework. While authentication involves verifying the identity of a user, permissions control whether certain users or groups of users should have access to a network resource, and what type of access should be granted. Different types of permissions models may be used for different types of users. For instance, internal users may use a POSIX permissions model, while external users may have a non-POSIX permissions model.

Various embodiments of the present disclosure introduce a permissions framework that allows for interoperation of multiple permissions models in a multi-tenant computing environment. Multiple interceptors may be employed to implement a common permissions framework, for example, for microservice requests, specific application programming interface (API) calls, user interface rendering, and so forth. The interceptors can communicate with a permissions service to determine the type of permissions that a user should have with respect to a given resource based at least in part on a group to which the user belongs. The groups may be, for example, internal user groups or external user groups.

As one skilled in the art will appreciate in light of this disclosure, certain embodiments may be capable of achieving certain advantages that improve the functioning of computer systems, including some or all of the following: (1) automated selection of an appropriate authentication approach when multiple authentication approaches are used for different classes of users, thereby simplifying the user interfaces, reducing latency, improving the user experience, and reducing computer hardware requirements to support distinct servers or URLs for the different classes of users; (2) automated authentication of at least some users, thereby simplifying the user interfaces and improving the user experience; (3) interoperation for multiple permissions models, thereby permitting legacy permissions models that are not extensible to be flexibly used alongside other permissions models that may be necessary to support different classes of users, which simplifies programming and reduces computing resource consumption; (4) scalability in adding services, application programming interfaces (APIs), authentication approaches, and/or permissions models; (5)

improved security and system availability by allowing for particular compromised authentication approaches and/or permissions models to be disabled while allowing others to remain active; (6) improved security by allowing for fine-grained blocking of internal API calls and user interface component rendering requests; and so on.

Figure 1:
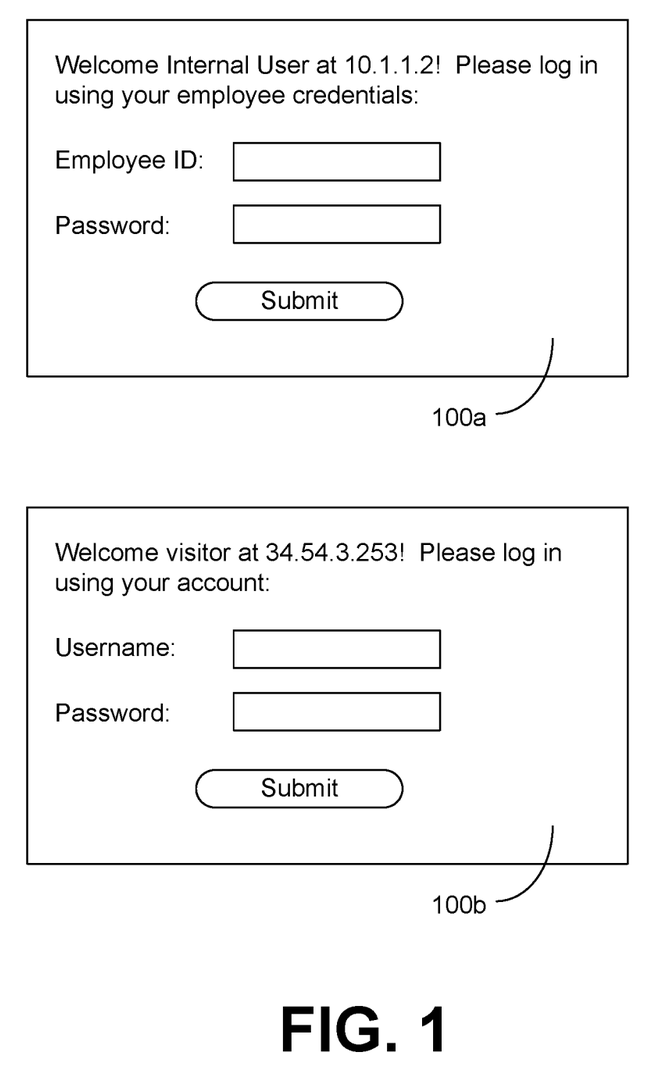
FIG. 1 shows drawings of examples of user interfaces generated in accordance with an embodiment of the present disclosure

With reference to FIG. 1, shown are examples of user interfaces 100a and 100b generated in accordance with an embodiment of the present disclosure. The user interfaces 100a and 100b correspond to log-in forms to access a network resource. Based on the network address of the requesting client device, different log-in forms are presented corresponding to different authentication approaches.

In the user interface 100a, the client device is detected to have a network address of "10.1.1.2," which is determined to be an internal user address. Consequently, the user interface 100a is generated to obtain credentials corresponding to an internal user, including an employee identifier and a password in this non-limiting example. By contrast, in the user interface 100b, the client device is detected to have a network address of "34.54.3.253," which is determined to be an external user address. Accordingly, the user interface 100b is generated to obtain credentials corresponding to an external user, including a username and a password. As will be discussed, a user may both internal and external accounts, and the context of the network can be used to determine which type of form to be presented. In the following discussion, a general description of the system and its components is provided, followed by a discussion of the operation of the same.

Figure 2A:
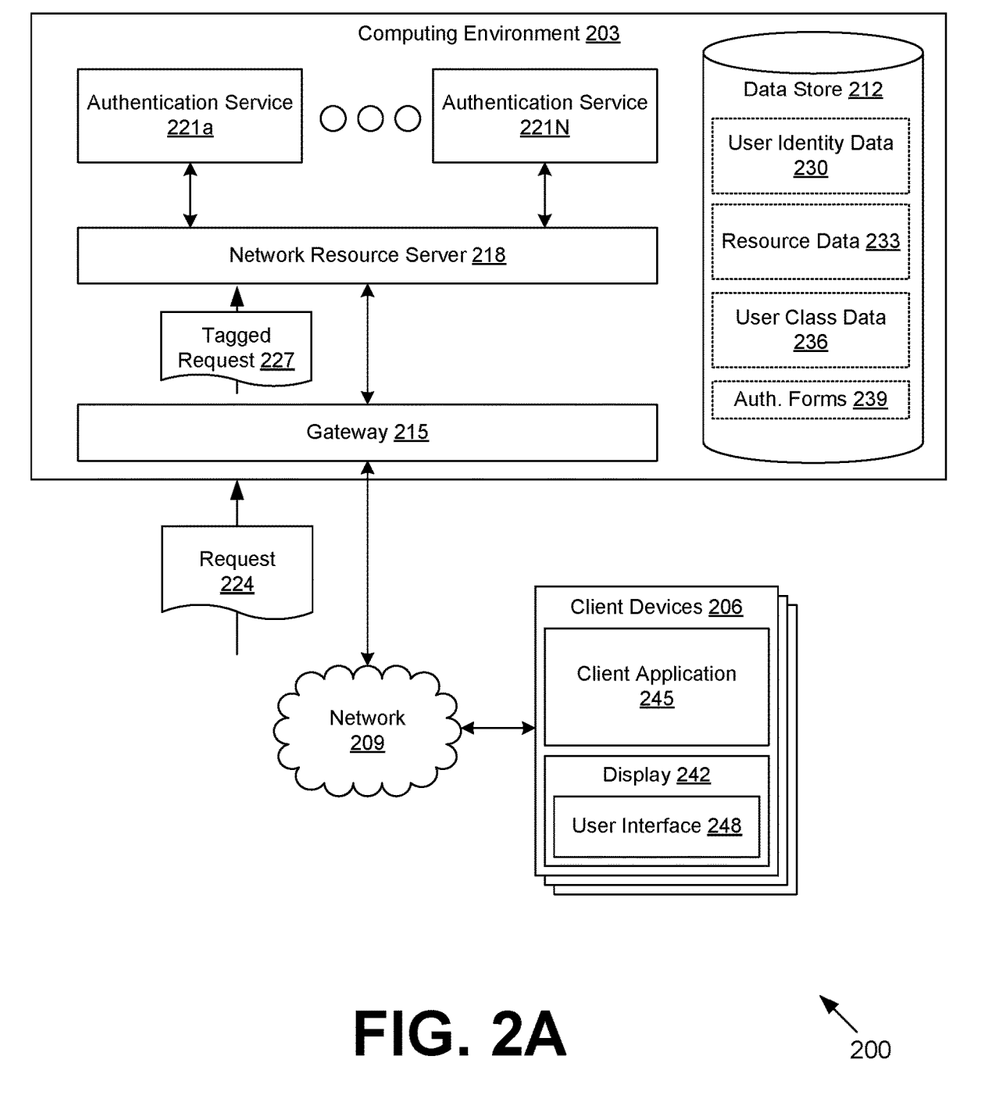
FIGS. 2A and 2B are schematic block diagrams of a networked environment according to various embodiments of the present disclosure.

With reference to FIG. 2A, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a gateway 215, a network resource server 218, a plurality of authentication services 221a ... 221N, and other applications, services, processes, systems, engines, or functionality not discussed in detail herein. The gateway 215 is executed to receive requests 224 for network resources from client devices 206 via the network 209. The gateway 215 examines location-identifying information associated with the request 224, such as a source network address (e.g., an Internet protocol address), global positioning system (GPS) coordinates, beacon data, etc., and then determines a class of users associated with the information associated with the request 224. The gateway 215 adds a tag to the request 224 indicating the user class, thereby generating a tagged request 227, and then forwards the tagged request 227 to a network resource server 218.

The network resource server 218 is executed to receive and respond to requests for network resources from client devices 206 and/or requests to perform operations with respect to the network resources. In particular, based on a tag associated with the tagged request 227, the network resource server 218 will cause the client device 206 to be authenticated using one of a plurality of different authentication approaches, which may correspond to a plurality of different authentication services 221.

Each of the authentication services 221 is configured to authenticate a client device 206 as having a user identity. The authentication services 221 may correspond to different identity providers and/or different databases of user identities or accounts. The authentication services 221 may use different combinations of authentication factors to authenticate a client device. For example, one authentication service 221 may utilize a username and a password, while another authentication service 221 may utilize a different username, a personal identification number, and one or more knowledge-based questions. Users may have user identities or accounts with multiple authentication services 221.

The data stored in the data store 212 includes, for example, user identity data 230, resource data 233, user class data 236, authentication forms 239, and potentially other data. The user identity data 230 corresponds to data regarding user identities for the multiple different authentication services 221. The user identity data 230 may include security credentials for the respective user identities. Such security credentials may include usernames, passwords, personal identification numbers, answers to knowledge-based questions, encryption keys, cookie data, and/or other information. It is noted that different authentication services 221 may utilize different types and/or combinations of security credentials in order to authenticate a user.

Some credentials, such as usernames, may be required to be locally unique for a given authentication service 221. However, such credentials may be globally unique when combined with a unique identifier for the given authentication service 221. For example, the username "john@smith.net" may be used by an internal authentication service 221, and the same username may be used by an external authentication service 221. The two may be distinguished by associating a unique identifier of the authentication service 221, e.g., "john@smith.net_INTERNAL" as compared to "john@smith.net_EXTERNAL."

The resource data 233 corresponds to data used by the network resource server 218 in generating and/or serving network resources to client devices 206. Such resource data 233 may encompass network pages, such as web pages, mobile application data, and/or other forms of network content, images, audio, video, executable programs, files, and/or other data.

The user class data 236 includes data that defines multiple different user classes, or types of users. Each user class may be associated with one or more authentication approaches or authentication services 221. A particular user may have accounts in one or more user classes. The user class data 236 may define a user class in terms of network segments or network address ranges. For example, the user class data 236 may define client devices 206 having network addresses within the range "10.x.x.x" as being internal users, client devices 206 having network addresses within the range "20.1.x.x" as being external users in a first corporate group, client devices 206 having network addresses within the range "21.3.x.x" as being external users in a second corporate group, and so forth. In other implementations, the user class data 236 may identify user classes in terms of latitude and longitude coordinates, beacon data, and/or other location-identifying information.

The authentication forms 239 may correspond to different authentication form components that may be used for different authentication approaches or authentication services 221. For example, a first authentication form 239 may correspond to the user interface 100a (FIG. 1), while a second authentication form 239 may correspond to the user interface 100b (FIG. 1). The authentication forms 239 may include hypertext markup language (HTML), extensible markup language (XML), and/or other data, or rules to generate such data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 242. The display 242 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 245 and/or other applications. The client application 245 may be executed in a client device 206, for example, to access network content served up by the computing environment 203 and/or other servers, thereby rendering a user interface 248 on the display 242. To this end, the client application 245 may comprise, for example, a browser, a dedicated application, etc., and the user interface 248 may comprise a network page, an application screen, etc. The client device 206 may be configured to execute applications beyond the client application 245 such as, for example, email applications, social networking applications, word processors, spreadsheets, and/or other applications.

Figure 2B:
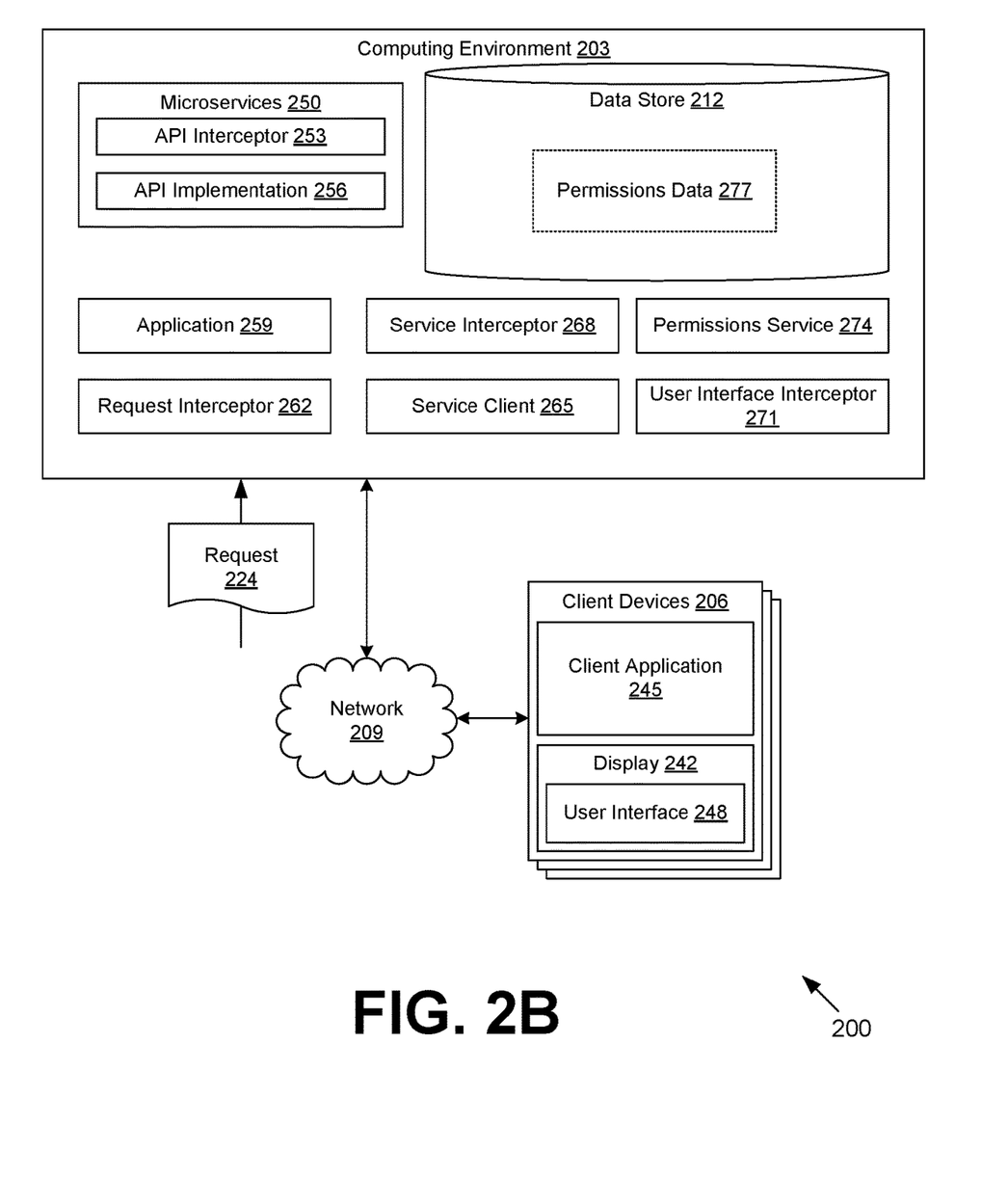

Moving on to FIG. 2B, shown is another view of the networked environment 200 of FIG. 2A showing additional or alternative components in the computing environment 203. The components executed on the computing environment 203, for example, may include one or more microservices 250, which includes an API interceptor 253 and an API implementation 256, an application 259, a request interceptor 262, a service client 265, a service interceptor 268, a user interface interceptor 271, a permissions service 274, and/or other components.

The application 259 may correspond to a web-based application or platform that manages access to secured resources using permissions. The application 259 may incorporate a controller and a user data controller in one implementation. The microservice 250 corresponds to a service that performs some portion of functionality on behalf of the application 259. The microservice 250 may encompass an API interceptor 253 that receives requests to perform API calls and permissions data and determines whether to continue the API call to the API implementation 256 based on the permissions data. The permissions data may also be passed to the API implementation 256 if needed for filtering by the API implementation.

The request interceptor 262 is executed to receive requests 224 from client devices 206 or other computer systems for network pages. The requests 224 may request that one or more operations be performed with respect to network resources. The request interceptor 262 may perform functionality such as authenticating a client device 206 as having a user identity, communicating with the permissions service 274 to determine whether the user identity has permission to perform a requested operation, receiving permissions data from the permissions service 274, and forwarding the permissions data to the application 259 for filtering if the user identity is determined to be permitted to perform the requested operation.

The service client 265 is used by the application 259 to communicate with the microservice 250. The service interceptor 268 intercepts the calls made by the service client 265 to the microservice 250. The service interceptor 268 may communicate with the permissions service 274 to verify that a user has permission to make the service call and also to fetch any permissions data that needs to be passed to the microservice 250 for filtering.

The user interface (UI) interceptor 271 intercepts the rendering of UI components by the application 259. The UI interceptor 271 then obtains permissions data from the permissions service 274 and verifies whether various UI components should be permitted to be rendered by the application 259.

The permissions service 274 manages permissions data 277 stored in the data store 212. In particular, the permissions service 274 responds to queries from the various interceptors (e.g., the request interceptor 262, the service interceptor 268, and the user interface interceptor 271) for data indicating the permissions associated with a user identity. The permissions service 274 may encompass multiple permissions models. For example, internal users may be associated with one permissions model (e.g., a Portable Operating System Interface (POSIX) permissions model or a Lightweight Directory Access Protocol (LDAP) model), while external users may be associated with a different permissions model. In this regard, the permissions service 274 may provide an abstraction on top of multiple permissions models for different groups or classes of users.

Figure 3:
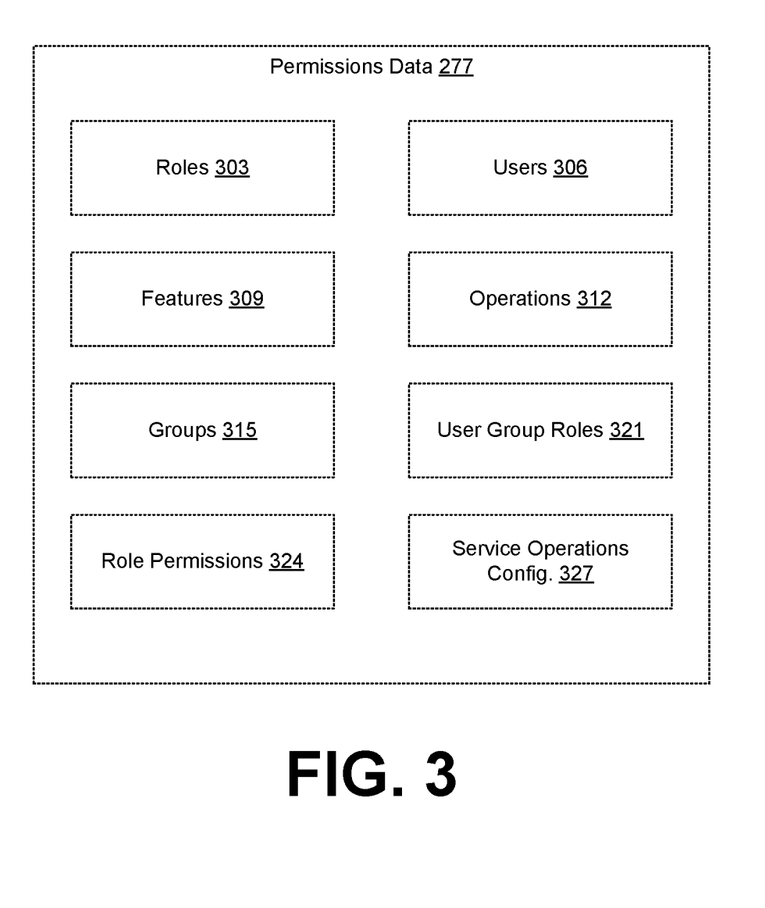
FIG. 3 is a schematic block diagram showing an example of permissions data according to various embodiments of the present disclosure.

Moving on to FIG. 3, shown is an example of the permissions data 277 managed by the permissions service 274 (FIG. 2B). The permissions data 277 may include data relating to roles 303, users 306, features 309, operations 312, groups 315, user group roles 321, role permissions 324, service operations configuration 327, and/or other data. The roles 303 are logical entities that determine which permissions a user 306 has with respect to a resource or a collection of resources. For example, a role 303 may be administrator, user, editor, reader, internal user, external user, etc. In one implementation, a roles 303 table may correspond to internal users who are managed by an internal permissions model. The users 306 correspond to user identities recognized by the permissions service 274.

A feature 309 is a logical entity indicating what is needed to access or manipulate a resource or collection of resources. For instance, a feature 309 may indicate APIs necessary to perform functions with respect to particular resources or collections of resources. An operation 312 is an action that can be performed on a feature 309, such as create, read, update, delete, and approve. A group 315 is a collection of users 306. A user 306 may have a specific role 303 within a group 315.

The user group roles 321 may define roles 303 of users 306 within a group 315 who are external users. The role permissions 324 determine which permissions are associated with a given role 303. The service operations configuration 327 determines the permissions needed to make API calls from different microservices 250 (FIG. 2B).

Figure 4:
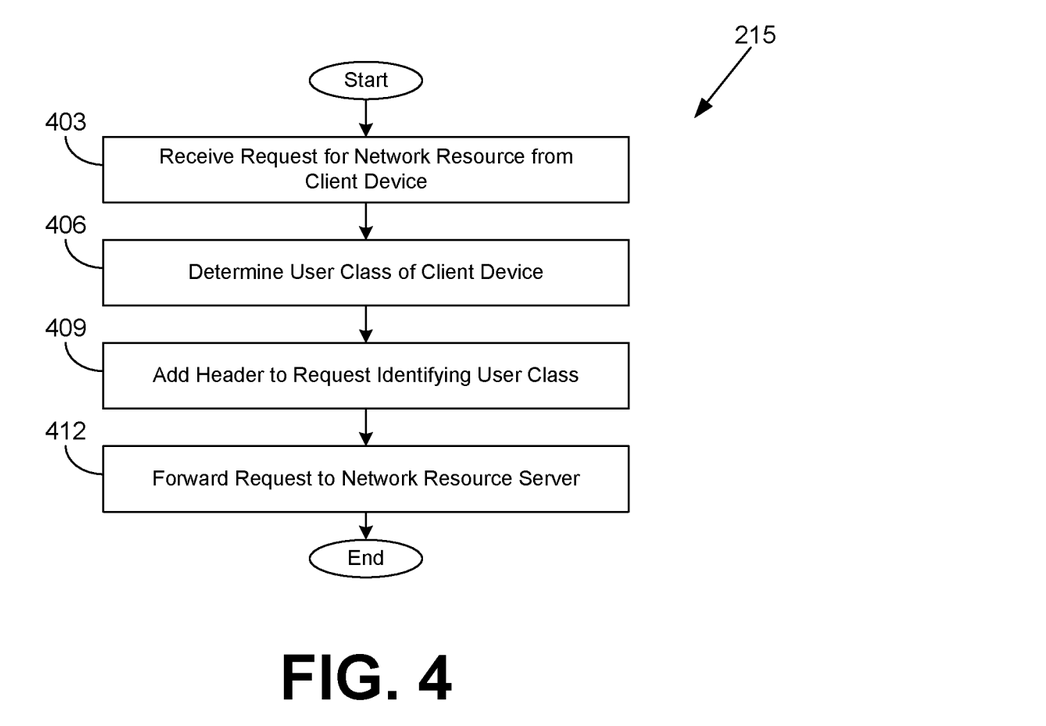
FIG. 4 is a flowchart illustrating one example of functionality implemented as portions of a gateway executed in a computing environment in the networked environment of FIG. 2A according to various embodiments of the present disclosure.

Turning now to FIG. 4, shown is a flowchart that provides one example of the operation of a portion of the gateway 215 according to various embodiments. It is understood that the flowchart of FIG. 4 provides merely an example of the many different types of functional arrangements that may be employed to implement the operation of the portion of the gateway 215 as described herein. As an alternative, the flowchart of FIG. 4 may be viewed as depicting an example of elements of a method implemented in the computing environment 203 (FIG. 2A) according to one or more embodiments.

Beginning with box 403, the gateway 215 receives a request 224 (FIG. 2A) for a network resource from a client application 245 (FIG. 2A) via a network 209 (FIG. 2A). For example, the request 224 may be a hypertext transfer protocol (HTTP) or HTTP secure (HTTPS) request. In box 406, the gateway 215 determines a user class of the client device 206 (FIG. 2B), for example, based at least in part on a network address embodied in the request 224. For example, the gateway 215 may determine a source internet protocol (IP) address from the request 224 and then determine a network address range or subnet to which the address belongs. The gateway 215 may classify client devices 206 as being internal or external based on the network address. The gateway 215 may classify client devices 206 as belonging to a particular organizational group based on the network address belonging to a network address range associated with the organization group. In another embodiment, the client device 206 may be configured to detect information from a wireless beacon and then forward that information to the gateway 215. The gateway 215 may then classify the client device 206 based at least in part on the beacon information.

In box 409, the gateway 215 adds a header to the request 224 identifying the determined user class, thereby generating a tagged request 227 (FIG. 2A). For example, the added header may be an HTTP header or an HTTPS header. In box 412, the gateway 215 then forwards the tagged request 227 on to a network resource server 218 (FIG. 2A) via an internal network of the computing environment 203. It is noted that requests 224 from any user group (e.g., internal or external) may be forwarded to the same network resource server 218. Also, the requests 224 may be directed at the same uniform resource locator (URL) rather than to different URLs corresponding to the different user classes. Thereafter, the operation of the portion of the gateway 215 ends.

Figure 5:
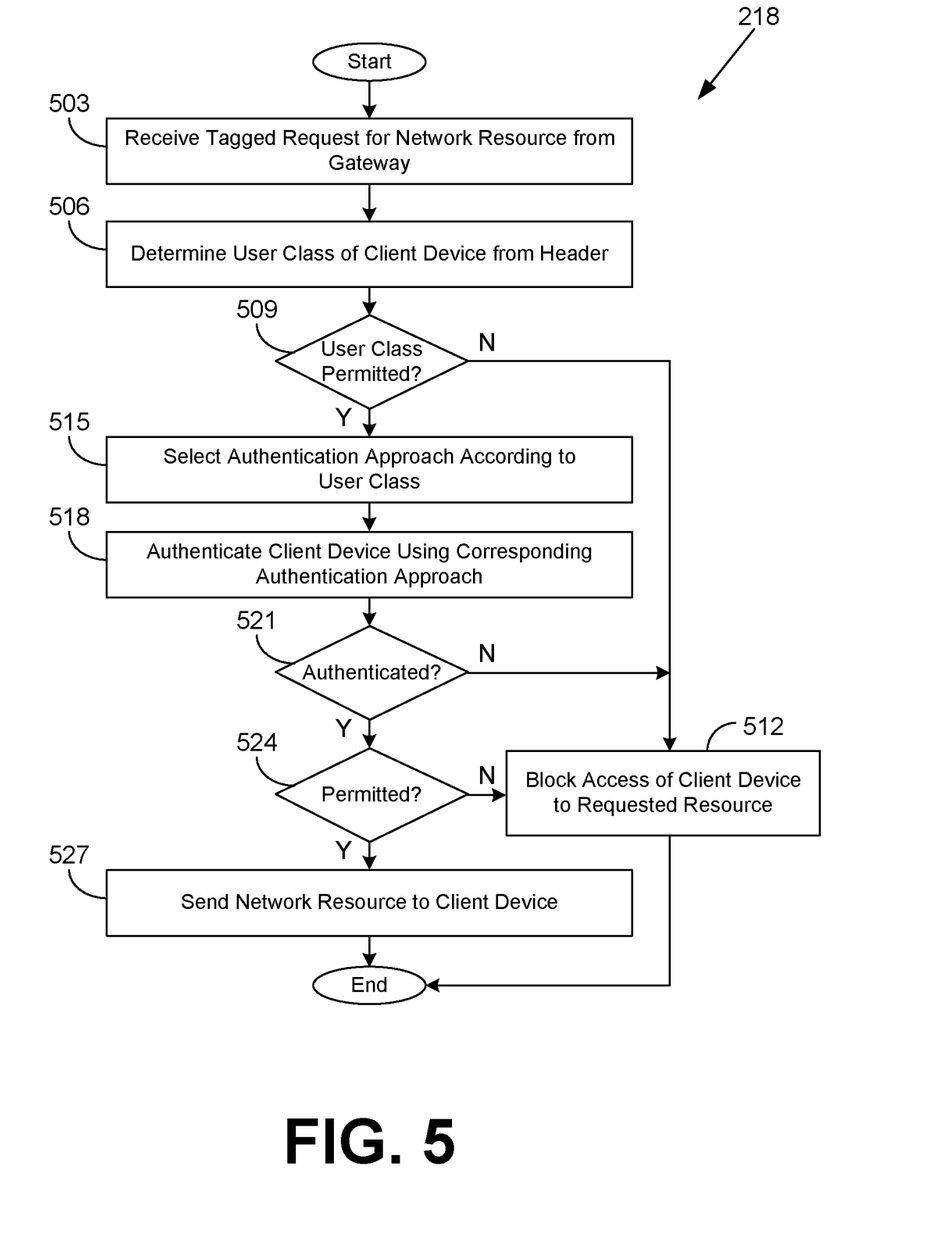
FIG. 5 is a flowchart illustrating one example of functionality implemented as portions of a network resource server executed in a computing environment in the networked environment of FIG. 2A according to various embodiments of the present disclosure.

Continuing to FIG. 5, shown is a flowchart that provides one example of the operation of a portion of the network resource server 218 according to various embodiments. It is understood that the flowchart of FIG. 5 provides merely an example of the many different types of functional arrangements that may be employed to implement the operation of the portion of the network resource server 218 as described herein. As an alternative, the flowchart of FIG. 5 may be viewed as depicting an example of elements of a method implemented in the computing environment 203 (FIG. 2A) according to one or more embodiments.

Beginning with box 503, the network resource server 218 receives a tagged request 227 (FIG. 2A) from a gateway 215 (FIG. 2A) over an internal network in the computing environment 203. In some implementations, the tagged request 227 does not include a network address of the client device 206 (FIG. 2A) or other location-identifying information. In box 506, the network resource server 218 determines a user class to which the client device 206 belongs from a header in the tagged request 227. For example, the header may contain an explicit identifier of the user class. In box 509, the network resource server 218 determines whether the user class is permitted to access the requested network resource. If not, the network resource server 218 moves from box 509 to box 512 and proceeds to block the access of the client device 206 to the requested network resource. Thereafter, the operation of the portion of the network resource server 218 ends.

Otherwise, the network resource server 218 moves from box 509 to box 515. In box 515, the network resource server 218 selects one of a plurality of authentication approaches based at least in part on the user class identified in box 506. For instance, the authentication approaches may correspond to distinct authentication services 221 (FIG. 2A), and the network resource server 218 may select a particular one of a plurality of authentication services 221. As an example, internal users may use a first authentication service 221, while external users may use a second authentication service 221.

In box 518, the network resource server 218 authenticates the client device 206 using the corresponding authentication approach. For example, the network resource server 218 may generate a network page in response to the tagged request 227, where the network page includes an authentication form 239 (FIG. 2A) that requests security credentials necessary for the client device 206 to be authenticated by the selected authentication service 221. The network resource server 218 and/or the authentication service 221 may receive the security credentials from the client device 206 by way of the form. The authentication service 221 may then verify whether the security credentials correspond to a valid user identity according to the user identity data 230 (FIG. 2A). Alternatively, the client device 206 may present cookie data corresponding to a registration token for authentication. The authentication service 221 may then verify that the cookie data corresponds to a valid user identity.

In box 521, the network resource server 218 determines whether the client device 206 has been properly authenticated. If not, the network resource server 218 moves from box 521 to box 512 and proceeds to block the access of the client device 206 to the requested network resource. Thereafter, the operation of the portion of the network resource server 218 ends.

Otherwise, in box 524, the network resource server 218 determines whether the client device 206 having the authenticated identity is permitted to access the requested network resource. If not, the network resource server 218 moves from box 524 to box 512 and proceeds to block the access of the client device 206 to the requested network resource. Thereafter, the operation of the portion of the network resource server 218 ends.

Otherwise, in box 527, the network resource server 218 sends the requested network resource to the client device 206. In some cases, the network resource server 218 may generate the network resource dynamically from the resource data 233 (FIG. 2A), or the network resource server 218 may load the network resource from the resource data 233. Thereafter, the operation of the portion of the network resource server 218 ends.

Figure 6:
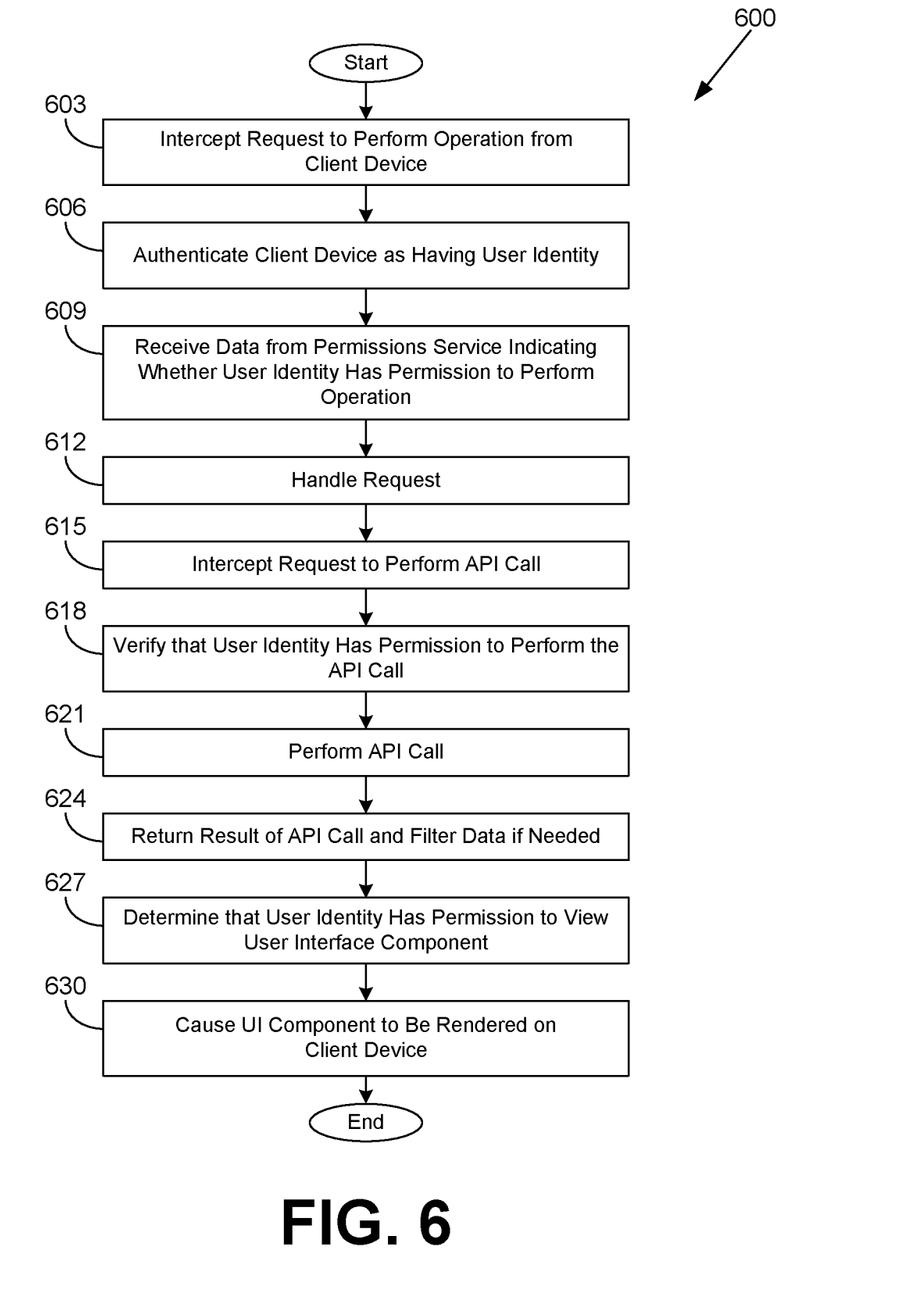
FIG. 6 is a flowchart illustrating one example of functionality implemented in a computing environment in the networked environment of FIG. 2B according to various embodiments of the present disclosure.

Referring next to FIG. 6, shown is a flowchart 600 that provides one example of the operation of a portion of the computing environment 203 (FIG. 2B) according to various embodiments. It is understood that the flowchart of FIG. 6 provides merely an example of the many different types of functional arrangements that may be employed to implement the operation of the portion of the computing environment 203 as described herein. As an alternative, the flowchart of FIG. 6 may be viewed as depicting an example of elements of a method implemented in the computing environment 203 (FIG. 2B) according to one or more embodiments.

Beginning with box 603, the request interceptor 262 (FIG. 2B) intercepts a request 224 (FIG. 2B) from a client device 206 (FIG. 2B) for an application 259 (FIG. 2B) to perform an operation 312 (FIG. 3) with respect to a network resource. For example, a user at the client device 206 may cause an HTTP request to be sent by a client application 245 (FIG. 2B) via the network 209 (FIG. 2B) to the computing environment 203. The operation 312 may include a create operation, a read operation, an update operation, a delete operation, an approve operation, and/or other types of operations.

In box 606, the request interceptor 262 may then authenticate the client device 206 as having a user identity. For example, the request interceptor 262 may communicate with an authentication service 221 (FIG. 2A) in order to verify a user identity associated with the client device 206. In box 609, the request interceptor 262 may request and receive data from the permissions service 274 (FIG. 2B) indicating whether the user identity has permission to perform the requested operation 312. The permissions service 274 may determine whether the user identity has permission to perform the operation 312 based at least in part on a group 315 (FIG. 3) to which the user 306 belongs, and the role 303 (FIG. 3) of the user 306 in the group 315. If the user can perform the operation 312, the permission service 274 may return data needed for filtering or performing the operation 312 to the request interceptor 262.

In box 612, the request interceptor 262 begins handling the request 224 via the application 259 (FIG. 2B). In this regard, the application 259 may make a number of calls to microservices 250 (FIG. 2B) using one or more service clients 265 (FIG. 2B). In doing so, the application 259 may forward the request to perform an operation to another service, the microservice 250, where the forwarded request includes the data from the permissions service 274. A service interceptor 268 may intercept these calls through the service client 265 in order to provide the data from the permissions service 274.

In box 615, an API interceptor 253 (FIG. 2B) intercepts a request from the microservice 250 for an API implementation 256 (FIG. 2B) to perform an API call. In box 618, the API interceptor 253 verifies that the user identity has permission to perform the API call using the data from the permissions service 274. The API interceptor 253 continues the API call to the API implementation 256 (FIG. 2B) and passes the data from the permissions service 274, which may be needed for filtering to perform the API call by the API implementation 256. In box 621, the API implementation 256 performs the API call. In box 624, the microservice 250 returns the result of the API call to the application 259. In some cases, the API implementation 256 may use the permissions data to filter the result, e.g., to include or exclude certain portions of data in the result. The API result data and/or the data from the permissions service 274 may be intercepted by the user interface interceptor 271.

In box 627, the user interface interceptor 271 (FIG. 2B) determines from the data from the permissions service 274 that the user identity has permission to view one or more user interface components that may use the result of the microservice 250. In box 630, the application 259 may cause the user interface components to be rendered on a display 242 (FIG. 2B) of the client device 206. For example, the application 259 may return network page data encoding the user interface components via the network 209 to the client device 206 for rendering by the client application 245. Thereafter, the operation of the flowchart 600 ends.

Figure 7:
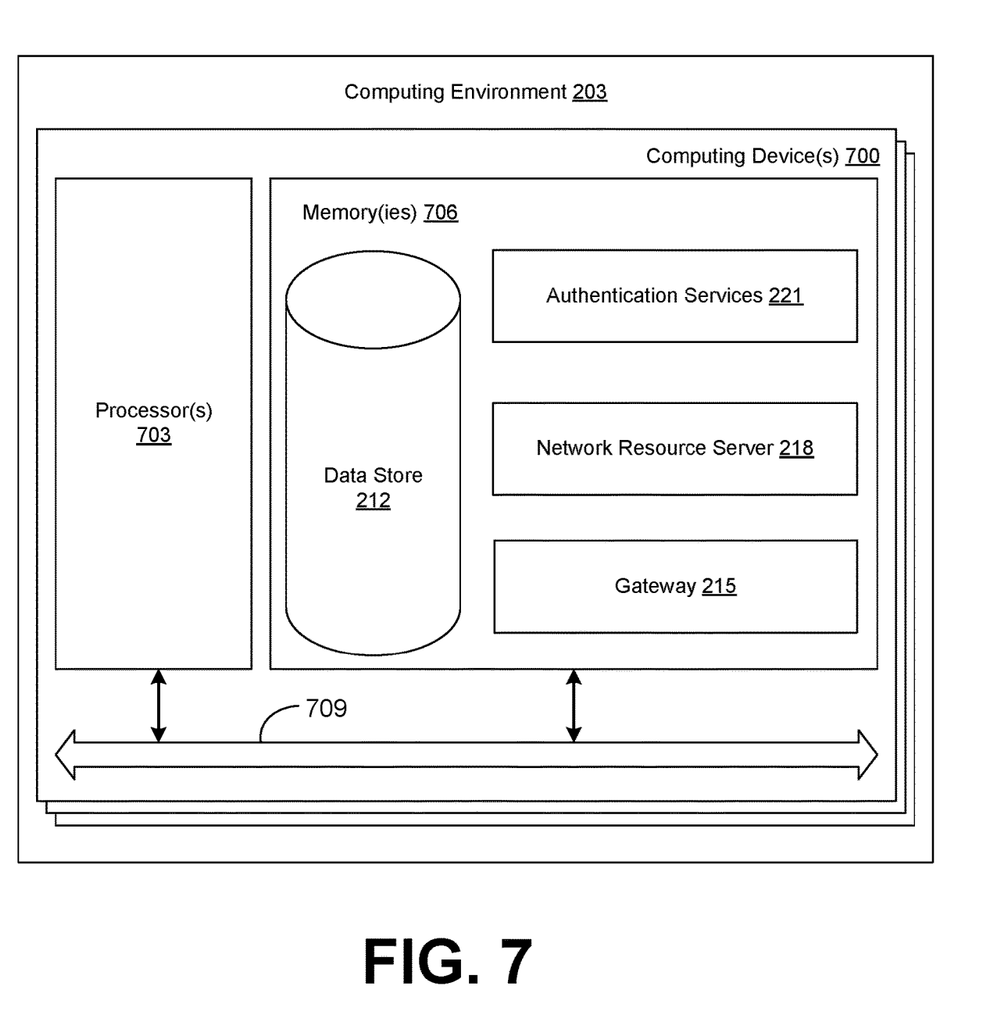
FIG. 7 is a schematic block diagram that provides one example illustration of a computing environment employed in the networked environment of FIGS. 2A and 2B according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are authentication services 221, a network resource server 218, a gateway 215, a microservice 250 (FIG. 2B), an application 259 (FIG. 2B), a request interceptor 262 (FIG. 2B), a service client 265 (FIG. 2B), a service interceptor 268 (FIG. 2B), a permissions service 274 (FIG. 2B), a user interface interceptor 271 (FIG. 2B), and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the computing environment 203. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, wherein when executed the at least one program causes the at least one computing device to at least:
receive a request to perform an operation with respect to a network resource from a client device;
determine a particular user class to which the client device belongs based at least in part on a network address of the client device, wherein the particular user class is one of a plurality of user classes;
add a header to the request that indicates the particular user class;
automatically select a particular authentication service of a plurality of authentication services according to the header of the request indicating the particular user class, wherein the plurality of authentication services are usable for authentication for access to the network resource;
authenticate the client device has having a user identity with the particular authentication service;
receive data from a permissions service indicating whether the user identity has permission to perform the operation; and
forward the request to perform the operation to another service, wherein the forwarded request includes the data from the permissions service.

2. The non-transitory computer-readable medium of claim 1, wherein determining the particular user class further comprises:
identifying a network address range corresponding to the network address of the client device; and
determining that the network address range corresponds to the particular user class.

3. The non-transitory computer-readable medium of claim 1, wherein when executed the at least one program further causes the at least one computing device to at least, responsive to the request to perform the operation, send a request to perform an application programming interface (API) call to an API implementation, wherein the request is intercepted by an API interceptor, and the request to perform the API call includes the data from the permissions service.

4. The non-transitory computer-readable medium of claim 1, wherein the operation comprises at least one of: a create operation, a read operation, an update operation, a delete operation, or an approve operation.

5. The non-transitory computer-readable medium of claim 1, wherein the user identity is associated with a user group, and the permissions service determines whether the user identity has permission to perform the operation based at least in part on the user group and a role of the user identity in the user group.

6. A system, comprising:
at least one computing device; and
at least one interceptor executable in the at least one computing device, wherein when executed the at least one interceptor causes the at least one computing device to at least:
intercept a request to perform an operation with respect to a network resource from a client device;
determine a particular user class to which the client device belongs based at least in part on a network address of the client device, wherein the particular user class is one of a plurality of user classes;
add a header to the request that indicates the particular user class;
automatically select a particular authentication service of a plurality of authentication services according to the header of the request indicating the particular user class, wherein the plurality of authentication services are usable for authentication for access to the network resource;
authenticate the client device has having a user identity with the particular authentication service;
receive data from a permissions service indicating whether the user identity has permission to perform the operation; and
forward the request to perform the operation to a service, wherein the forwarded request includes the data from the permissions service.

7. The system of claim 6, wherein the operation comprises at least one of: a create operation, a read operation, an update operation, a delete operation, or an approve operation.

8. The system of claim 6, wherein the user identity is associated with a user group, and the permissions service determines whether the user identity has permission to perform the operation based at least in part on the user group and a role of the user identity in the user group.

9. The system of claim 8, wherein the permissions service determines the user group based at least in part on a determination whether the user identity corresponds to an internal user or an external user.

10. The system of claim 6, wherein when executed in the at least one computing device the service causes the at least one computing device to at least:
responsive to the request to perform the operation, send a request to perform an application programming interface (API) call to an API implementation, wherein the request is intercepted by an API interceptor, and the request to perform the API call includes the data from the permissions service.

11. The system of claim 10, wherein when executed in the at least one computing device the API interceptor causes the at least one computing device to at least:
verify that the user identity has permissions to perform the API call based at least in part on the data from the permissions service included in the request to perform the API call;
cause the API call to be performed;
filter a result of the API call by removing a portion of data from the result based at least in part on the data from the permissions service; and
return the filtered result to the service.

12. The system of claim 6, further comprising a user interface interceptor executable in at least one computing device, wherein when executed in the at least one computing device the user interface interceptor causes the at least one computing device to at least:
receive the data from the permissions service and a result of performing the operation;

determine from the data that the user identity has permission to view a user interface component; and cause a user interface component to be rendered on the client device.

13. A method, comprising:

intercepting, via at least one of one or more computing devices, a request to perform an operation with respect to a network resource from a client device;

determining, via at least one of the one or more computing devices, a particular user class to which the client device belongs based at least in part on a network address of the client device, wherein the particular user class is one of a plurality of user classes;

adding, via at least one of the one or more computing devices, a header to the request that indicates the particular user class;

automatically selecting, via at least one of the one or more computing devices, a particular authentication service of a plurality of authentication services according to the header of the request indicating the particular user class, wherein the plurality of authentication services are usable for authentication for access to the network resource;

authenticating, via at least one of the one or more computing devices, the client device has having a user identity with the particular authentication service;

receiving, via at least one of the one or more computing devices, data from a permissions service indicating whether the user identity has permission to perform the operation; and forwarding, via at least one of the one or more computing devices, the request to perform the operation to a service, wherein the forwarded request includes the data from the permissions service.

14. The method of claim 13, wherein the operation comprises at least one of: a create operation, a read operation, an update operation, a delete operation, or an approve operation.

15. The method of claim 13, wherein the user identity is associated with a user group, and the permissions service determines whether the user identity has permission to perform the operation based at least in part on the user group and a role of the user identity in the user group.

16. The method of claim 15, wherein the permissions service determines the user group based at least in part on a determination whether the user identity corresponds to an internal user or an external user.

17. The method of claim 13, further comprising, responsive to the request to perform the operation, sending, via at least one of the one or more computing devices, a request to perform an application programming interface (API) call to an API implementation, wherein the request is intercepted by an API interceptor, and the request to perform the API call includes the data from the permissions service.

18. The method of claim 17, further comprising:

verifying, via at least one of the one or more computing devices, that the user identity has permissions to perform the API call based at least in part on the data from the permissions service included in the request to perform the API call;

causing, via at least one of the one or more computing devices, the API call to be performed;

filtering, via at least one of the one or more computing devices, a result of the API call by removing a portion of data from the result based at least in part on the data from the permissions service; and returning, via at least one of the one or more computing devices, the filtered result to the service.

19. The method of claim 13, further comprising:

receiving, via at least one of the one or more computing devices, the data from the permissions service and a result of performing the operation;

determining, via at least one of the one or more computing devices, from the data that the user identity has permission to view a user interface component; and causing, via at least one of the one or more computing devices, a user interface component to be rendered on the client device.

20. The method of claim 13, wherein determining the particular user class further comprises:

identifying, via at least one of the one or more computing devices, a network address range corresponding to the network address of the client device; and determining, via at least one of the one or more computing devices, that the network address range corresponds to the particular user class.

* * * * *